United States Patent [19]

Kasubuchi et al.

[11] Patent Number: 4,536,804
[45] Date of Patent: Aug. 20, 1985

[54] DATA CONTROL SYSTEM FOR STORING DIGITAL AND AUDIO INFORMATION ON A MAGNETIC TAPE

[75] Inventors: Takeshi Kasubuchi, Nara; Takeo Hara, Ikoma; Kaoru Ozawa, Yamatokoriyama, all of Japan

[73] Assignee: Sharp Kabushiki Kaisha, Osaka, Japan

[21] Appl. No.: 413,882

[22] Filed: Sep. 1, 1982

Related U.S. Application Data

[60] Division of Ser. No. 218,361, Dec. 19, 1980, , which is a continuation of Ser. No. 806,483, Jun. 14, 1977.

[30] Foreign Application Priority Data

Jun. 14, 1976 [JP] Japan .................................. 51-70017
Jun. 14, 1976 [JP] Japan .................................. 51-70018
Sep. 10, 1976 [JP] Japan .................................. 51-109012

[51] Int. Cl.³ .............................................. G11B 5/00
[52] U.S. Cl. ........................................ 360/4; 360/32
[58] Field of Search ................................. 360/2, 4, 32

[56] References Cited

U.S. PATENT DOCUMENTS

| | | | |
|---|---|---|---|
| 3,956,740 | 5/1976 | Jones et al. | 360/4 |
| 3,999,050 | 12/1976 | Pitroda | 364/900 |
| 4,117,542 | 9/1978 | Klausner et al. | 364/900 |
| 4,387,296 | 6/1983 | Newell et al. | 360/4 |

*Primary Examiner*—Vincent P. Canney
*Attorney, Agent, or Firm*—Birch, Stewart, Kolasch & Birch

[57] ABSTRACT

A magnetic tape recorder is removably secured to an electronic digital information processing apparatus of the portable type for storing digital information and audio information. The digital information stored in the magnetic tape recorder is let out from the magnetic tape recorder in response to commands introduced through a keyboard means included in the electronic digital information processing apparatus and is displayed on a digital display secured on the electronic digital information processing apparatus. In a preferred form, another keyboard means is removably associated with the electronic digital information processing apparatus, whereby many kinds of information can be stored in the magnetic tape recorder.

2 Claims, 13 Drawing Figures

DATA CONTROL SYSTEM FOR STORING DIGITAL AND AUDIO INFORMATION ON A MAGNETIC TAPE

This application is a divisional of copending application Ser. No. 218,361, filed on Dec. 19, 1980 which is a continuation of application Ser. No. 806,483 filed on June 14, 1977.

BACKGROUND AND SUMMARY OF THE INVENTION

The present invention relates to a multi-purpose electronic apparatus of the portable type including a magnetic tape recorder for storing digital and audio information.

An electronic calculator of the portable type including an electronic timepiece function has been developed. However, the conventional electronic calculator has small memory capacity and, therefore, many kinds of information related to, for example, telephone numbers, time tables of the trains, airplanes and buses, conversion tables, and business data can not be stored in the conventional electronic calculator.

Accordingly, an object of the present invention is to provide an electronic digital information processing apparatus of the portable type which can store many kinds of information.

Another object of the present invention is to provide an electronic digital information processing apparatus of the portable type which can store many kinds of information and which can develop a desired information stored in the electronic digital information processing apparatus in response to commands derived from a keyboard means secured on the electronic digital information processing apparatus.

Still another object of the present invention is to provide an electronic digital information processing apparatus of the portable type which can store digital and analogue, or, audio information on a magnetic tape.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a magnetic tape recorder is removably secured to an electronic digital information processing apparatus of the portable type for storing digital information and analogue, or, audio information. The electronic digital information processing apparatus includes a keyboard means for introducing digital information into the electronic digital information processing apparatus, a digital-to-analogue converter for converting the digital information derived from the keyboard means into an analogue signal suited for recording on the magnetic tape, an analogue-to-digital converter for converting an analogue signal derived from the magnetic tape into a digital signal, and a digital display for displaying the digital information in accordance with the digital signal derived from the analogue-to-digital converter.

The information stored in the magnetic tape recorder is led out from the magnetic tape recorder in response to commands introduced through the keyboard means and is displayed on the digital display. In a preferred form, another keyboard means is removably associated with the electronic digital information processing apparatus, whereby many kinds of information can be stored in the magnetic tape recorder.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
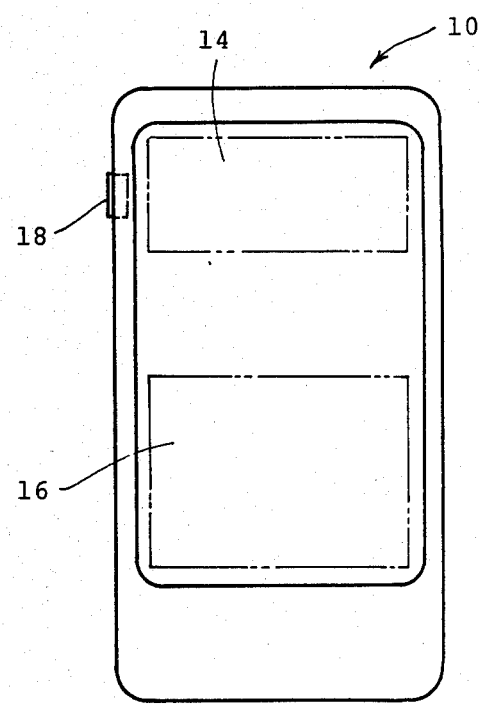
FIG. 1 is a schematic plan view of an embodiment of an electronic digital information processing apparatus of the present invention.
Figure 2:
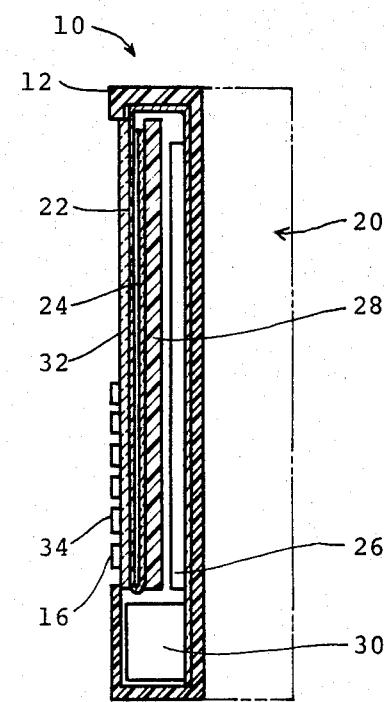
FIG. 2 is a cross-sectional view of the electronic digital information processing apparatus of FIG. 1.

FIGS. 1 and 2 show an embodiment of an electronic digital information processing apparatus of the present invention.

The electronic digital information processing apparatus 10 mainly comprises a casing 12, a digital display 14, a key input means 16, and a power supply switch 18. A magnetic tape recorder unit 20 is removably attached to the back of the electronic digital information processing apparatus 10 for storing digital and analogue, or, audio information.

The electronic digital information processing apparatus 10 includes a flexible substrate 22 made of a transparent plastic film or a transparent, insulating sheet disposed within the casing 12 in a serpentine fashion. Pattern electrodes for displaying purposes are formed on the confronting surfaces of the flexible substrate 22, between which a liquid crystal composition 24 or electrochromic display elements are filled via a suitable spacer, whereby the digital display 14 is formed. Alternatively, the digital display 14 can be formed on a glass substrate.

An extended portion of the flexible substrate 22 functions as a substrate for various electronic components 26 disposed within the electronic digital information processing apparatus 10. The electronic components 26 control the operation of the electronic digital information processing apparatus 10 inclusive of the digital display 14 in accordance with commands derived from the key input means 16. The key input means 16 includes a display means disposed at the back of the keyboard for displaying functions of the key switches included within the key input means 16.

A reinforcing plate 28 is provided for supporting the flexible substrate 22 at the digital display 14 and the key input means 16. The reinforcing plate 28 is made of plastics colored black. A power supply unit 30 is mounted at the end of the extended portion of the flexible substrate 22. The power supply unit 30 includes a main cell and an auxiliary cell. The main cell and the auxiliary cell are associated with the power supply switch 18 in such a manner that all parts of the electronic digital information processing apparatus 10 are enabled by the main cell when the power supply switch 18 is closed. At this moment, the power supply from the auxiliary cell is interrupted. When the power supply switch 18 is open, a digital memory section and a timepiece function section included within the electronic digital information processing apparatus 10 are enabled by the auxiliary cell.

A transparent glass plate 32 is provided for protecting the flexible substrate 22 from the ambience. The key input means 16 includes a plurality of touch sensitive electrodes 34 formed on the transparent glass plate 32. The touch sensitive electrodes 34 are made of a transparent, electrically conductive film such as an indium oxide film and a thin oxide film. The touch sensitive electrodes 34 are formed at positions corresponding to the display means for labeling the electrodes 34 through the use of evaporation technique or spattering technique.

The display means functions to label the operation of the touch sensitive electrodes 34. When, for example, the electronic digital information processing apparatus 10 is placed in the electronic calculator mode, the touch sensitive electrodes 34 are labeled as numeral keys and function keys required for calculator operation by the display means installed behind the touch sensitive electrodes 34.

Figure 3:
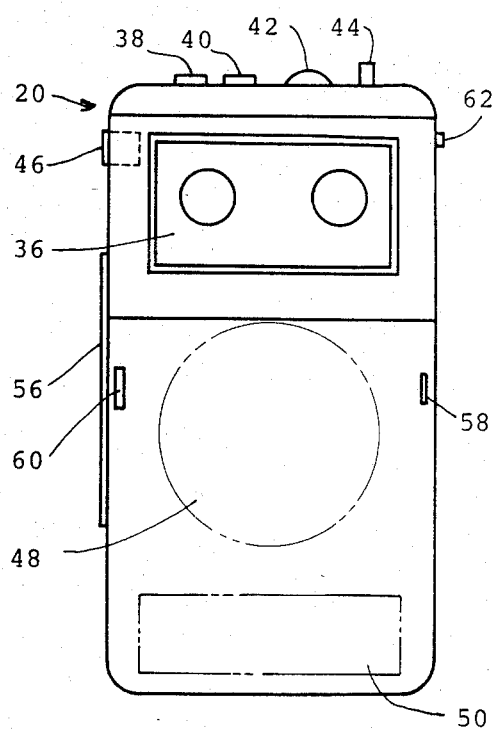
FIG. 3 is a plan view of a magnetic tape recorder associated with the electronic digital information processing apparatus of FIG. 1.
Figure 4:
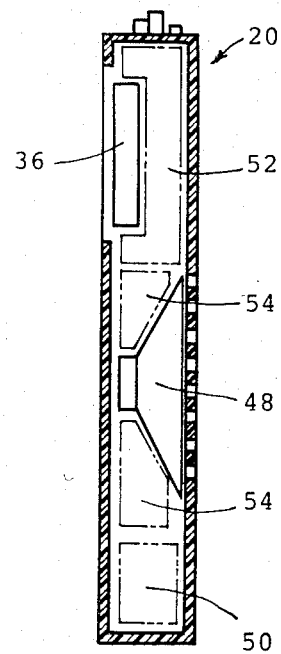
FIG. 4 is a cross-sectional view of the magnetic tape recorder of FIG. 3.

FIGS. 3 and 4 show an embodiment of the magnetic tape recorder unit 20 removably attached to the back of the electronic digital information processing apparatus 10. Although the magnetic tape recorder unit 20 is discrete from the electronic digital information processing apparatus 10 in this embodiment, the magnetic tape recorder unit 20 can be incorporated into the electronic digital information processing apparatus 10.

The magnetic tape recorder unit 20 mainly comprises a cassette type magnetic tape 36, a playback button 38, a record button 40, a volume control 42, a multi-purpose lever 44 for placing the tape drive into stop, fast forward, fast rewind, and pose modes, a microphone 46, a speaker 48, and a power supply cell 50. The magnetic tape recorder unit 20 further includes a tape drive mechanism 52 and circuit components 54.

The magnetic tape recorder unit 20 is attached to the back of the electronic digital information processing apparatus 10 through the use of a hook 56 and a lock means 58, and electrically connected with the electronic digital information processing apparatus 10 through the use of a connector 60. A selection switch 62 is provided for selecting the operating modes between the automatic mode and the manual mode. When the selection switch 62 is set at the automatic mode, the magnetic tape recorder unit 20 functions as a data recorder associated with the electronic digital information processing apparatus 10. When the selection switch 62 is set at the manual mode, the magnetic tape recorder unit 20 functions as a normal tape recorder for recording audio information.

Figure 5:
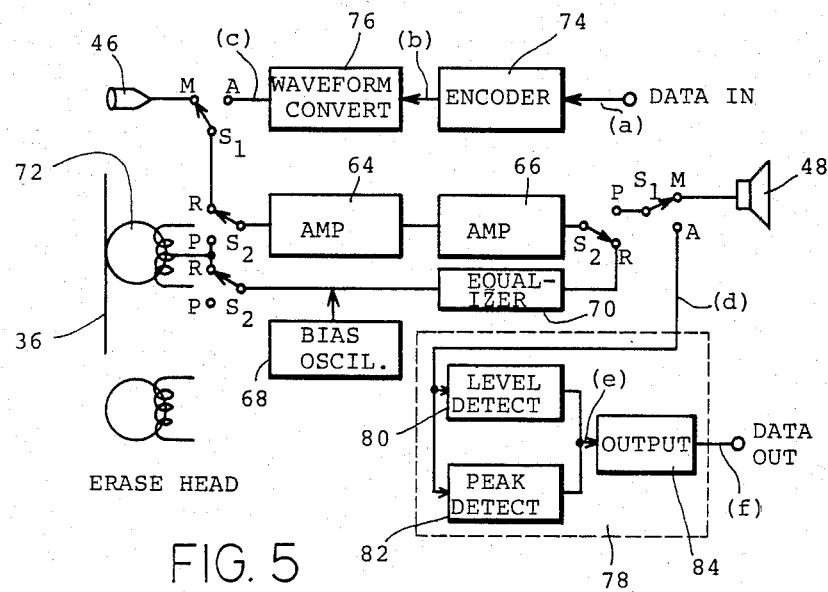
FIG. 5 is a block diagram of an embodiment of a magnetic tape recorder employed within the electronic digital information processing apparatus of the present invention.

FIG. 5 is a block diagram showing a construction of the magnetic tape recorder unit 20.

The magnetic tape recorder unit 20 includes a preamplifier 64, a main amplifier 66, a bias oscillating circuit 68 and a recording equalizer circuit 70, which are conventional ones employed in the normal tape recorder apparatus.

Switches $S_1$ are associated with the selection switch 62 in such a manner that the movable contacts are connected to manual terminals M when the selection switch 62 is set at the manual mode, and the movable contacts are connected to auto-terminals A when the selection switch 62 is set at the automatic mode. Switches $S_2$ are associated with the record button 40 in such a manner that the movable contacts are connected to record terminals R when the record button 40 is locked to place the magnetic tape recorder unit 20 in the record mode, and the movable contacts are connected to playback terminals P when the magnetic tape recorder unit 20 is placed in the playback mode.

When the switches $S_1$ are inclined to the manual terminals M and the switches $S_2$ are inclined to the record terminals R, an input signal introduced from the microphone 46 is applied to the recording equalizer circuit 70 through the amplifiers 64 and 66. Output signals of the recording equalizer circuit 70 are applied to a record/playback head 72. At this moment, the bias oscillating circuit 68 develops a bias current for recording the input information on the cassette type magnetic tape 36.

When the switches $S_1$ are set at the manual mode and the switches $S_2$ are set at the playback mode, playback signals derived from the record/playback head 72 are applied to the speaker 48 through the amplifiers 64 and 66 for playing back the audio information.

Figure 6:
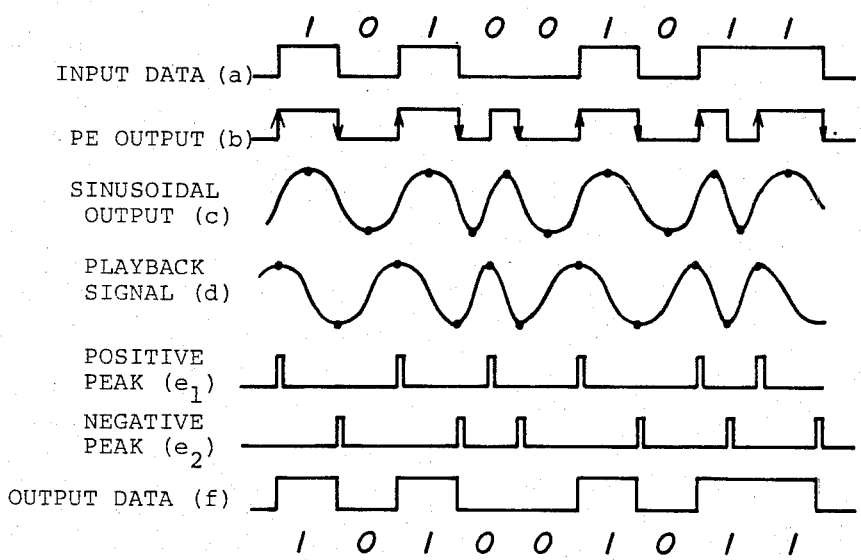
FIG. 6 is a time chart showing various signals occurring within the magnetic tape recorder of FIG. 5.

The operating mode of the magnetic tape recorder unit 20 used as the data recorder will be described with reference to FIG. 6.

The magnetic tape recorder unit 20 further includes an encoder 74, a waveform converter 76, and a digital data read out section 78.

The encoder 74 receives a digital data signal (a) serially applied from the electronic digital information processing apparatus 10 to develop a phase encoded signal (b). The waveform converter 76 functions to convert the phase encoded signal (b) derived from the encoder 74 into a sinusoidal waveform (c). That is, the waveform converter 76 develops an analogue signal of the sinusoidal waveform having frequencies f and 2f.

The digital data read out section 78 includes a level detector 80, a peak detector 82, and a data output circuit 84. The digital data read out section 78 functions to convert the playback signal derived from the record/playback head 72 into a digital signal The level detector 80 and the peak detector 82 function, in combination, to develop a positive peak indicating pulse signal ($e_1$) and a negative peak indicating pulse signal ($e_2$) in response to positive peaks and negative peaks of the playback signal (d) derived from the record/playback head 72.

When the switches $S_1$ are connected to the auto-terminals A and the switches $S_2$ are connected to the record terminals R, the magnetic tape recorder unit 20 functions as the data recorder. The digital signal (a) derived from the electronic digital information processing apparatus 10 is introduced into the encoder 74. The encoder 74 develops the phase encoded signal (b), which is applied to the waveform converter 76 for providing an analogue signal, or, the sinusoidal output (c) suited for the amplifiers 64 and 66. The thus provided analogue signal is recorded on the magnetic tape 36 through the use of the record/playback head 72. The sinusoidal signals of the frequencies f and 2f developed from the waveform converter 76 have approximately the same amplitude.

When the switches $S_1$ are connected to the auto-terminals A and the switches $S_2$ are connected to the playback terminals P, the sinusoidal signals recorded on the magnetic tape 36 are detected by the record/playback head 72 and applied to the amplifiers 64 and 66. At this moment, the gain of the amplifiers 64 and 66 is maintained at a fixed value. The thus provided Playback signal (d) is applied to the digital data read out section 78, which develops a digital signal (f) to be applied to the electronic digital information processing apparatus 10.

As already discussed above, the level detector 80 and the peak detector 82 function, in combination, to develop the positive peak indicating pulse signal ($e_1$) and the negative peak indicating pulse signal ($e_2$) in response to the positive and negative peaks of the playback signal (d). The data output circuit 84 functions to delete phase bits (shown by P in the positive peak ($e_1$) and the negative peak ($e_2$) of FIG. 6) included within the positive peak indicating pulse signal ($e_1$) and the negative peak indicating pulse signal ($e_2$), whereby the digital signal (f) is developed.

Figure 7:
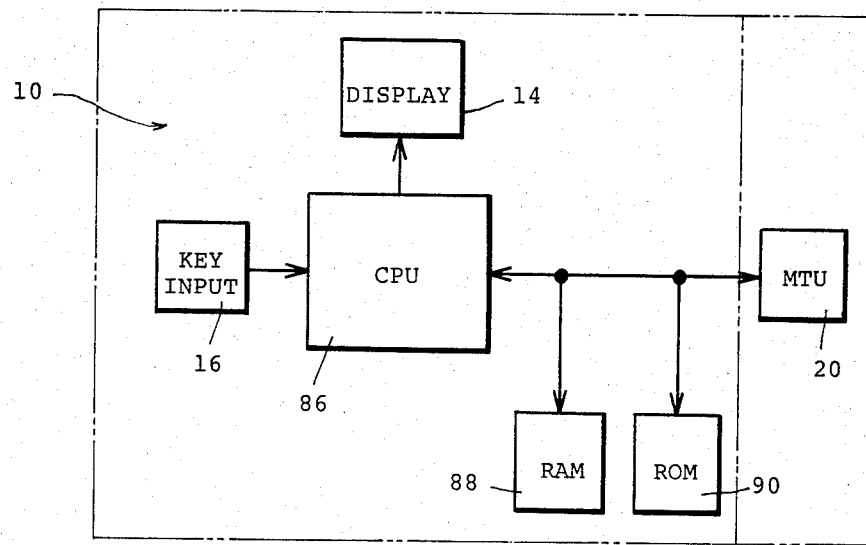
FIG. 7 is a block diagram of the electronic digital information processing apparatus of FIG. 1.

FIG. 7 schematically shows a total system of the electronic digital information processing apparatus 10 and the magnetic tape recorder unit 20. Like elements corresponding to those of FIGS. 1 and 2 are indicated by like numerals.

The system mainly comprises the key input means 16, the digital display 14 of the matrix type, a central processing unit 86, a random access memory 88, a read only memory 90, and the magnetic tape recorder unit 20. In a preferred form, the central processing unit 86 includes a timepiece function section.

Now assume that the power supply switch 18 is closed and the arithmetic calculator mode is selected through the key input means 16. The read only memory 90 develops a control signal to the central processing unit 86, whereby the display means positioned behind the touch sensitive electrodes 34 are enabled so as to label the touch sensitive electrodes 34 as the numeral keys and the function keys required for the calculator operation. In this way, the calculation operation is performed through the use of touch sensitive electrodes 34, the read only memory 90 and the central processing unit 86. The operation results are indicated at the digital display 14. In a preferred form, the operation procedure is recorded in the random access memory 88 and/or the magnetic tape recorder unit 20.

When the operator desires to memory certain information into the magnetic tape recorder unit 20, a memory mode is selected through the key input means 16. The display means positioned behind the touch sensitive electrodes 34 are enabled so as to label the touch sensitive electrodes 34 with numerals and characters required for introducing the digital information.

Under these conditions, desired digital information is stored in the magnetic tape recorder unit 20 through the use of the key input means 16. The input data is checked through the use of the digital display 14.

The read out operation of the information stored in the magnetic tape recorder unit 20 is conducted through the key input means 16. The digital information read out from the magnetic tape recorder unit 20 is applied to the central processing unit 86, whereby the desired information is displayed on the digital display 14.

Figure 8:
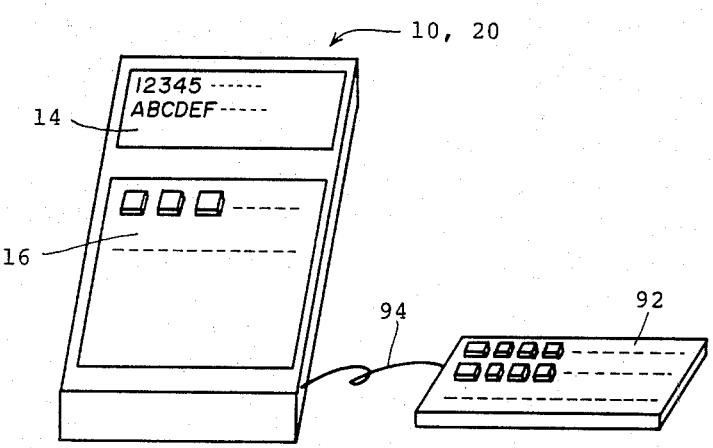
FIG. 8 is a perspective view of another embodiment of an electronic digital information processing apparatus of the present invention.

FIG. 8 shows another embodiment of the electronic digital information processing apparatus of the present invention. Like elements corresponding to those of FIGS. 1 and 2 are indicated by like numerals.

In this embodiment, the magnetic tape recorder unit is incorporated into the electronic digital information processing apparatus. An auxiliary keyboard 92 is associated with the electronic digital information processing apparatus via a connection wire 94 for introducing various kinds of information related to, for example, a telephone number, a time table of a train, airplane, bus, etc., and a conversion table into the electronic digital information processing apparatus.

Figure 9:
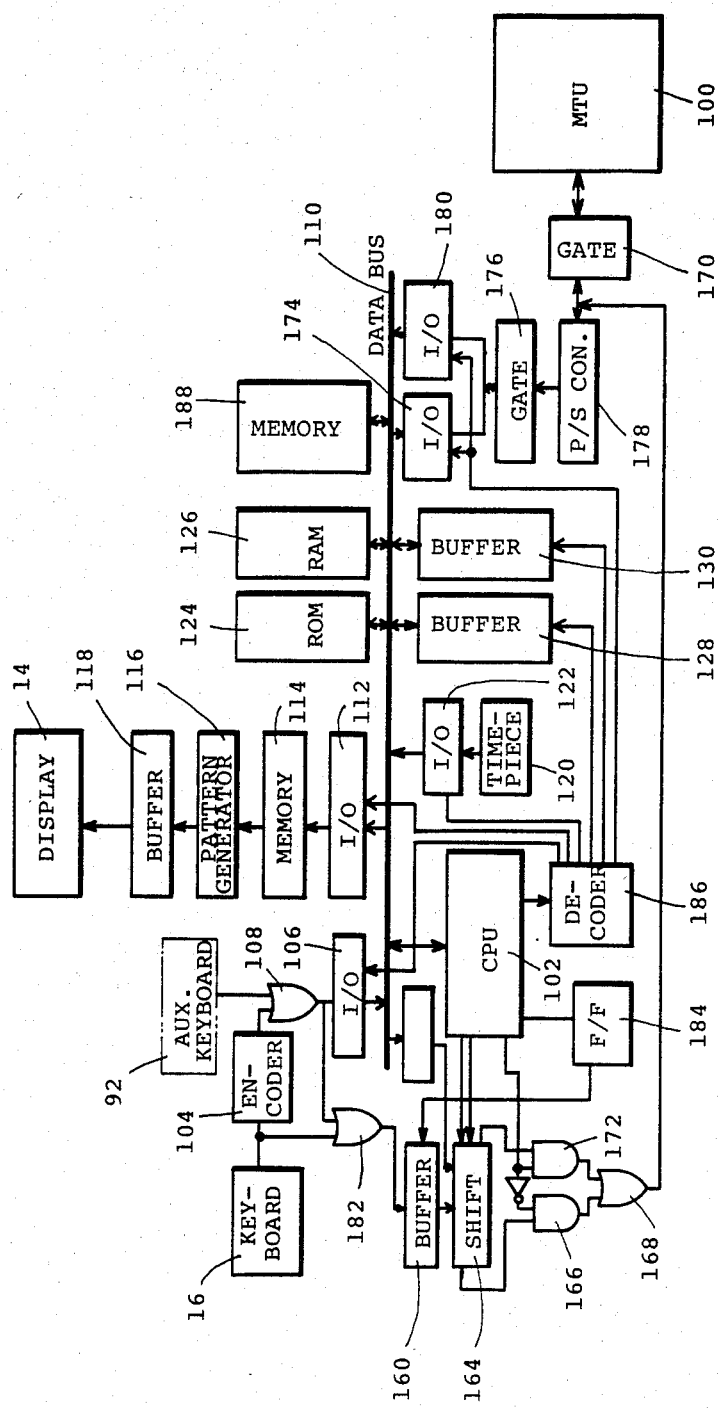
FIG. 9 is a block diagram of the electronic digital information processing apparatus of FIG. 8.

FIG. 9 shows a construction of the electronic digital information processing apparatus of FIG. 8.

The system mainly comprises the keyboard 16, the auxiliary keyboard 92, the digital display 14, a magnetic tape recorder unit 100, and a central processor unit 102.

Output signals of the keyboard 16 are applied to an encoder 104. Output signals of the encoder 104 and the auxiliary keyboard 92 are applied to an input/output device 106 through an OR gate 108 for applying the input data to a data bus 110.

Another input/output device 112 functions to latch the data to be applied to the digital display 14. Output signals of the input/output device 112 are applied to a memory means 114 which has the memory capacity corresponding to one frame of the digital display 14. A pattern generator 116 is connected to receive output signals of the memory means 114. A buffer register 118 functions to store character pattern information derived from the pattern generator 116, the buffer register 118 having the capacity corresponding to one scanning line of the character pattern.

A timepiece function chip 120 is connected to the data bus 110 via an input/output device 122. A read only memory 124 and a random access memory 126 are connected to the data bus 110. Data buffers 128 and 130 are provided for performing data communication with the magnetic tape recorder unit 100.

Figure 11:
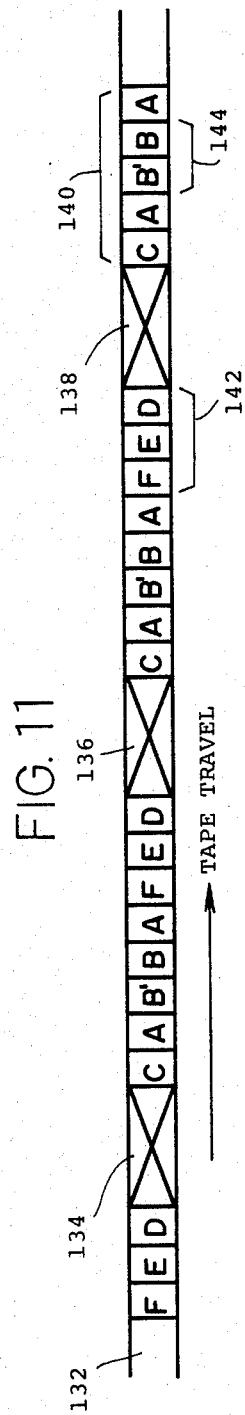
FIGS. 11 through 13 are plan views showing data storage conditions memoried on a magnetic tape for explaining operating modes of the electronic digital information processing apparatus of FIG. 8.
Figure 12:
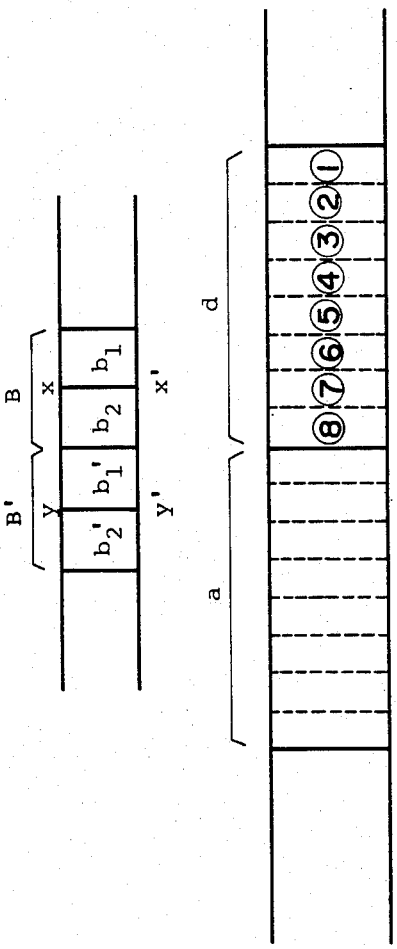
Figure 13:
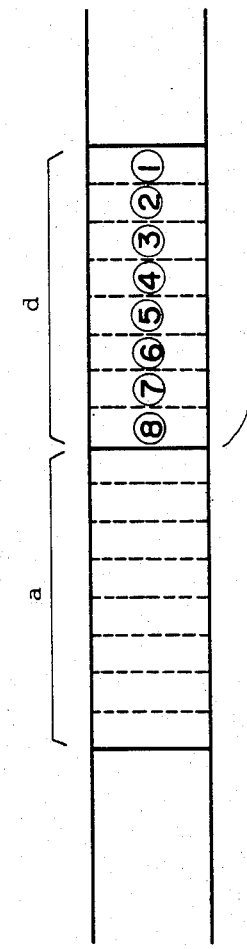

FIGS. 11 through 13 show data storage conditions memoried on the magnetic tape.

In FIG. 11, reference numeral 132 represents a magnetic tape on which information is recorded, and 134, 136 and 138 represent data sections. Now assume that the data length of the data section 138 is below two hundred and fifty-six (256) bytes, the data section 136 has different contents from the data section 138 and has the data length of two hundred and fifty-six (256) bytes, and the data section 134 has the same contents as the data section 136 and has the data length below two hundred and fifty-six (256) bytes. Block number codes 140 are provided for each data block, and codes 142 are provided at the end of each data block.

A designates the inter block gap, which has the length longer than the distance between the recording head and the reading out head. B and B′ designate the block number codes. C designates a preamble for performing the bit synchronization. The preamble C has the eight (8) bit length. E designates a cyclic redundancy check code having the sixteen (16) bit length, and F designates a postamble having the same bit length as the preamble C. D designates a code of eight (8) bits for distinguishing the data section from the cyclic redundancy check code E and the postamble F.

FIG. 12 shows a section 144 of the block number cods B and B′.

Both of the block number codes B and B′ have thirty-two (32) bits. The block number code B occupies a tape length of L, and the block number code B′ occupies a tape length of 20L though the drawing of FIG. 12 does not exactly show the tape length. This is because the magnetic tap 132 is driven to travel at a speed V in the normal record and playback modes, whereas the magnetic tape 132 is driven to travel at a speed 20 V in the fast forward and the fast rewind modes. The block number code B is effective at the tape speed V, and the block number code B′ is effective at the tape speed 20 V.

Sections $b_1$ and $b_2$ have the same bits and have the same information symmetrical at x—x′. Sections $b_1'$ and $b_2'$ have the same bits and have the same information symmetrical at y—y′. In this way, the block number code can be detected even when the magnetic tape 132 is driven to travel in the counter direction.

FIG. 13 shows a detailed bit construction of the section $b_1$ of the block number code B. A code d shows contents of the data block and comprises eight (8) bits. Another code a represents an address code of the data block. Since the code a comprises eight (8) bits, the addresses of $2^8$ kinds can be selected.

The code d comprises bits 1 through 8. The bit 1 is provided for distinguishing between the audio signal and the digital signal. The bit 2 functions to determine the data write in and the data read out. The bit 3 is a flag showing the calculator operation mode, the bit 4 is a flag showing the timepiece function mode, and the bit 5 is a flag showing that the data has contents more than two hundred and fifty-six (256) bytes, or, the contents are extended over more than one data block. The bit 6 is "0" for the first block, and "1" for the following blocks in the case when the data has contents longer than one block. The bit 7 shows whether the data is a constant one or not. And the bit 8 is a blank bit.

Figure 10:
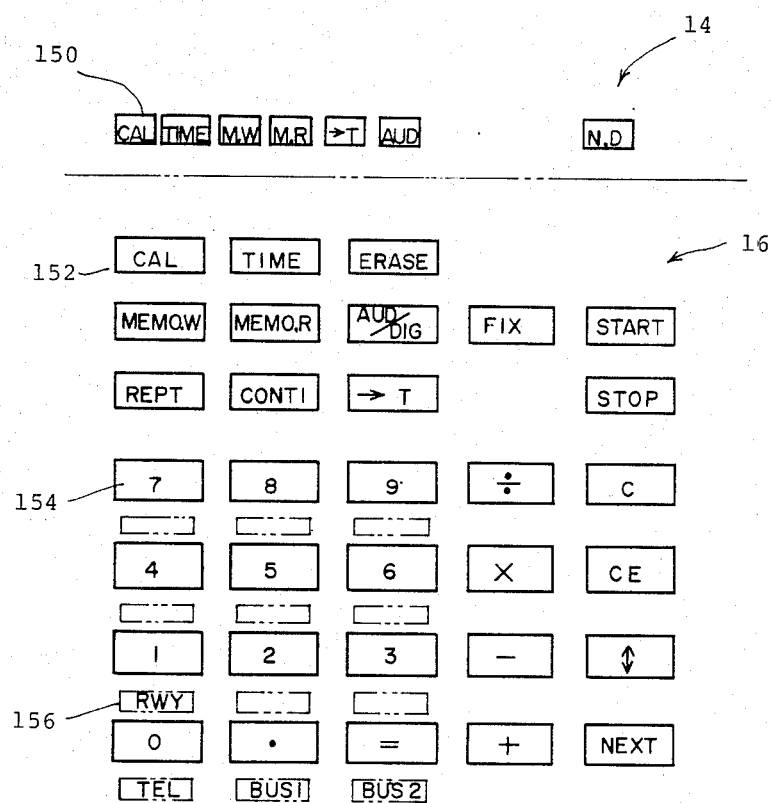
FIG. 10 is a plan view of an embodiment of a keyboard means employed within the electronic digital information processing apparatus of FIG. 8.

FIG. 10 shows a typical array of the keyboard 16.

The digital display 14 includes a mode indicator 150 for indicating the operation mode of the electronic digital information processing appratus 10. The keyboard 16 includes function keys 152 for instructing the operation mode of the electronic digital information processing apparatus 10, and numeral keys 154 for introducing numeral information. The numeral keys 154 are labeled by display means 156, whereby desired information can be read out by operating the numeral keys 154 labeled by the display means 156.

When, for example, the telephone number information is stored in the block number "0", the telephone number information can be read out by operating the numeral key "0". When the time table of railways is stored in the block number "1", the time table of the railways can be read out by operating the numeral key "1".

The write in operation of desired information is conducted through the auxiliary keyboard 92, which is removably associated with the electronic digital information processing apparatus. The auxiliary keyboard 92 includes all of the keys installed on the keyboard 16, and character keys.

Now assume the condition where the time table of the railway is desired to be memoried in the system. The bit 1 of the data code d should indicate the digital information. Therefore, the system is placed in the digital mode throught the use of an "AUD/DIG" key installed on the auxiliary keyboard 92. Thereafter, a "ME-MO.W" key is operated to introduce the information into the bit 2. As to the bits 3 through 6, no operation is required. A "FIX" key is operated to introduce a signal showing fixed information. In this way, the data block code d stores the information "00000010" (corresponding to the bits 1, 2, 3, 4, 5, 6, 7 and 8 of the data block code d).

Thereafter, the numeral key "1" is operated to introduce the information "00000001" into the address code a, since the time table of the railway should be memoried in the first address. The thus introduced data block code d is stored in a buffer register 160 (see FIG. 9), and the address code a is stored in an address code buffer register 162.

Subsequently, a "START" key is operated and desired information is written in through the use of suited keys installed on the auxiliary keyboard 92. The introduced data is displayed on the digital display 14 through the buffer memory 114, and is stored in the data buffer 130. The data buffers 128 and 130 have the capacity of two hundred and fifty-six (256) bytes.

The contents stored in the buffer register 160 are transferred to a right/left shift register 164 when a "NEXT" key is operated in the case where the data is less than two hundred and fifty-six (256) bytes, or when the data has reached two hundred and fifty-six (256th) byte. The contents of the right/left shift register 164 are applied to the magnetic tape recorder unit 100 through gates 166 and 168 and a transmission gate 170. And the contents stored in the buffer register 162 are applied to the magnetic tape recorder unit 100 via the right/left shift register 164, the gates 166 and 168 and the transmission gate 170.

In this manner, the section $b_1$ (see FIG. 12) is transferred. In order to transfer the information to the section $b_2$, the contents of the buffer register 162 are firstly applied to the magnetic tape recorder unit 100 via the right/left shift register 164, an AND gate 172, the gate 168, and the transmission gate 170. Secondly, the contents of the contents of the buffer register 160 are applied to the magnetic tape recorder unit 100 in the same manner. The sections $b_1'$ and $b_2'$ are recorded by driving the magnetic tape 132 at the speed 20 V.

The preamble C is developed from the read only memory 124 after formation of the inter block gap A. The preamble C developed from the rear only memory 124 is applied to the magnetic tape recorder unit 100 through an input/out device 174, a transmission gate 176, a parallel/serial converter 178, and the transmission gate 170.

The data stored in the data buffer 130 is transferred through the input/output device 174, the transmission gate 176, the parallel/serial converter 178, and the transmission gate 170. When all of the contents stored in the data buffer 130 are transferred, the codes D, E and F are automatically developed, and the inter block gap A is formed and, then, the magnetic tape 132 is stopped. The codes D and F are developed from the read only memory 124, and the cyclic redundancy check code E is developed in the magnetic tape recorder unit 100.

Now assume that the time table information of the railway is less than two hundred and fifty-six (256) bytes, and the data is written on the data block 138 (see FIG. 11).

Subsequently, when the telephone number is desired to be memorized, the data block code d, "00000010", and the address code a, "00000000" are introduced and stored in the buffer registers 160 and 162.

Thereafter, the telephone number data is sequentially introduced and stored in the data buffer 130. When the data of the two hundred and fifty-sixth (256th) appears at the input/output device 106, the flag is automatically stood at the bit 5 of the data block code d and, therefore, the codes becomes "00001010", "00000000". The thus formed codes are transferred to the magnetic tape recorder unit 100, and the contents stored in the data buffer 130 are also transferred to the magnetic tape recorder unit 100. In this way, the telephone number data is stored in the data block 136 (see FIG. 11), and the codes D, E, F and A are automatically created and the tape drive is stopped.

At this moment, the flag is automatically stood at the bit 6 of the data code, because the data block 134 should store the same contents as the data block 136. The contents of the buffer register 160 is changed and held till the "NEXT" key is operated. That is, the data block code d and the address code a become "00001110" and "00000000", respectively. The data following the two hundred and fifty-seventh (257th) bytes is stored in the data buffer 128. When the "NEXT" key is operated, the data block code "00001110" and the address code "00000000" are transferred, and the telephone number data is memorized on the data section 134 of the magnetic tape 132.

The following is the operation to read out the information recorded on the magnetic tape 132. The read out operation is conducted through the keyboard 16 installed on the electronic digital information processing apparatus 10.

The operation mode and the address code are sequentially selected. Now assume the condition where the telephone number data is desired to be read out.

The "FIX", "MEMO.R", and "AUD/DIG" keys are operated to place the electronic digital information processing apparatus 10 in the digital data read out mode. Thereafter, the numeral key "0" is operated to select the address storing the telephone number data. The information "01000010,00000000" corresponding to the data block code d and the address code a is stored in the central processor unit 102.

When the "START" key is operated, the magnetic tape 132 is driven to travel at the speed 20 V to detect the block which has the data block code d of which the bit 7 is "1". The signal is applied from the magnetic tape recorder unit 100 to the central processor unit 102 for coincidence detection purposes through the transmission gate 170, the parallel/serial converter 178, the transmission gate 176, and an input/output device 180. At this moment, the section B' (see FIG. 12) is detected since the magnetic tape 132 travels at the speed 20 V.

When the coincidence of the bit 7 is detected, the coincidence of the address code a is detected. When the coincidence of the address code a is detected, the tape speed is slowed down to V. The synchronization is performed through the use of the preamble C and, thereafter, the data memoried on the data block 136 is read out and stored in the data buffer 130 and the buffer memory 114 for display purposes.

When the read out operation is conducted to the two hundred and fifty-six bytes, the code D appears to indicate the end of the data signals, and the code E is introduced into the central processor unit 102.

The central processor unit 102 functions to compare the code E read out from the magnetic tape 132 with the calculated cyclic redundancy check code. When the coincidence is not detected, the "REPT" key should be operated to repeat the read out operation.

When the coincidence is detected, the gate of the data buffer 130 is closed and the following block number code section is read out and stored in the random access memory 126. At this moment, the data buffer 132 is strobed to prepare for the following data read in. The following data memoried on the data section 134 is read out and stored in the data buffer 128 and the buffer memory 114. The contents stored in the buffer memory 114 are displayed on the digital display 14.

In FIG. 9, an OR gate 182 is provided for introducing the information into the buffer register 160, a flip-flop 184 functions to stand the flag at the 5 and 6 bits in the data block code d, a decoder 186 is provided for selecting the input/output devices 106, 112, 122, 174 and 180, and a non-volatile memory 188 is provided for storing the data in addition to the magnetic tape recorder unit 100.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic information processing apparatus capable of operating in at least a data processing mode or calculator operation mode comprising:

keyboard means for introducing digital or calculator information into said information processing apparatus;

means for converting said digital information into analog information;

magnetic tape recorder means for recording said analog information received from said keyboard means onto a magnetic tape, said tape recorder means being capable of operating in a normal record mode, a playback mode, a fast forward and a fast rewind mode;

control circuit means for controlling the recordation of said analog information onto said magnetic tape in a predetermined format wherein said format includes, a plurality of individual data sections having said information recorded therein, each of said data sections being separated from one another by a certain distance on said magnetic tape, and a plurality of block number codes corresponding, respectively, to said plurality of data sections, said block number codes being indicative of the modes of operation of said information processing apparatus and the type of information recorded on said magnetic tape, each of said block number codes including a first section, used in the normal record modes and the playback mode of said tape recorder means and a second section, directly adjacent said first section, used in the fast forward and fast rewind modes of said tape recorder means, wherein said first section and said second section of said block number codes each include, a first plurality of bits, and a second plurality of bits directly adjacent to said first plurality of bits, said second plurality of bits being the same bits and containing the same information as said first plurality of bits, whereby said block number codes on said magnetic tape are detectable by said magnetic tape recorder means when said magnetic tape is driven to travel in a forward direction and in a reverse direction, wherein said first and second plurality of bits each include, a bit for determining the type of said information being recorded on said magnetic tape, and a bit to distinguish between a data write-in mode and a data read out mode of said electronic information processing apparatus; and display means positioned behind said keys on said keyboard means for displaying indicia indicative of numeral keys and function keys required for introducing calculator information into said electronic information processing apparatus when said apparatus is operating in a calculator operation mode, and for displaying indicia indicative of numerals and characters required for introducing digital information into said apparatus when said information processing apparatus is operating in a data processing mode.

2. The electronic information processing apparatus of claim 1, wherein said electronic information processing apparatus is further capable of operating in a timepiece function mode; and wherein said first and second plurality of bits each further include;

a bit indicating that said information processing apparatus is operating in said calculator operation mode, and a bit indicating that said information processing apparatus is operating in said timepiece function mode.

* * * * *